United States Patent Office 2,967,388
Patented Jan. 10, 1961

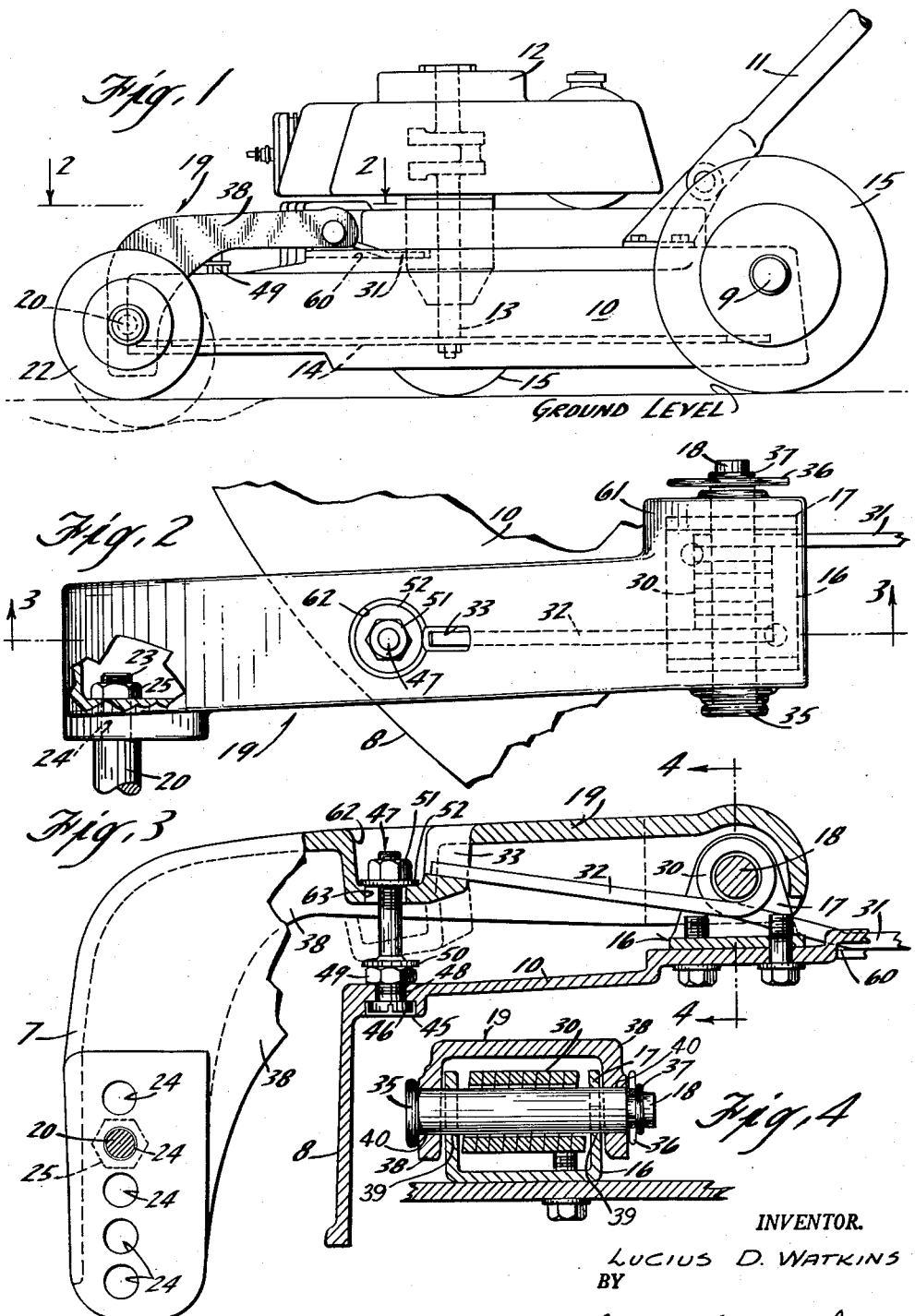

2,967,388
LAWN MOWER HAVING A SPRING LOADED WHEEL

Lucius D. Watkins, Hartland, Wis., assignor to Outboard Marine Corporation, Waukegan, Ill., a corporation of Delaware Filed July 24, 1957, Ser. No. 673,910

4 Claims. (Cl. 56—25.4)

The invention relates to a lawn mower having a spring loaded wheel.

The object of the invention is to provide a more stable base for a lawn mower, particularly a lawn mower of the rotary type in which the cutting is done by a blade revolving in a horizontal plane within a downwardly opening housing. It is well known that when such a mower is used on uneven ground the tilting of the mower frequently causes the housing or the blade to come into contact with the ground, resulting in scalping, or shearing away of the grass rather than a proper cutting action.

It is known that scalping can be reduced by increasing the number of wheels on the housing and by so spacing the wheels as to provide numerous points of support from front to back. These expedients are not satisfactory, because a multiplicity of wheels prevents the close approach of the housing to vertical objects such as trees or buildings, thus circumventing the very desirable characteristic ability of the rotary mower to mow extremely close to such an obstruction.

When the wheels are staggered to present numerous points of support from the front to the back of the mower some of the wheels will leave the ground when the ground is uneven, allowing the mower to tilt and produce an uneven cut, even when scalping is avoided.

The device of the present invention prevents scalping without the disadvantages of prior art devices because of the disclosed structure in which at least one of the front wheels of the mower is spring mounted. In the disclosed embodiment of the invention the wheel has a support arm which is pivoted on a portion of the mower housing and which is spring biased toward a ground engaging position with sufficient tension to support the mower housing at the proper distance from the ground. In traversing uneven ground the front wheel oscillates about the support arm pivot. The spring exerts substantially constant pressure on the arm. Accordingly, the housing assumes a position which substantially averages out the variation in ground level and produces an even cut without scalping.

In the drawings:

Figure 1 is a side elevation view of a rotary mower provided with a spring wheel according to my invention.

Figure 2 is a fragmentary plan view on an enlarged scale showing the arm upon which the spring wheel is mounted.

Figure 3 is a plan view with parts broken away as shown in section on line 3—3 of Figure 2.

Figure 4 is a cross sectional view on line 4—4 of Figure 3.

The mower consists generally of a housing 10 provided with a handle 11 and an engine 12.

Engine 12 has a crank shaft 13 extending through the housing 10, on the lower end of which is mounted a cutting blade 14. Conventional wheels 15 are provided at various points on the housing. In the illustrated embodiment wheels 15 are on rear axle 9 and a side axle, not shown.

In addition to these conventional parts I provide a bracket 16 secured to the top surface of housing 10 and having upstanding ears 17 to support pivot pin or pintle 18. Channel-shaped lever 19 has depending side flanges pivotally connected to pin 18 for oscillation of the lever 19 about the axis of pivot pin 18. In the preferred embodiment of the invention wheel support lever 19 extends generally forwardly and horizontally. Beyond the periphery 8 of housing 10 lever 19 has a downward extension 7. Wheel 22 is journaled for rotation on stub shaft 20 which has threaded portion 23 adapted to enter one of a series of holes or sockets 24 in lever extension 7 and to be secured therein by nut 25.

This mode of fastening is particularly desirable because of the ease with which the height of the mower above the ground may be changed, but any other convenient mode of fastening the stub shaft to lever 19 may be adopted.

As best shown in Figures 3 and 4 the pivot pin 18 is surrounded by a helically coiled torsion spring 30, having an end 31 engaged in seat 60 in the mower housing 10. The other end 32 of the spring is engaged in seat 33 in lever 19. Spring 30 is biased to exert downward thrust on the free end of lever 19. The spring consists of a substantial number of coils, eight being illustrated in the drawing. Accordingly, the spring exerts substantially constant biasing pressure on the lever, notwithstanding the limited oscillation of lever 19 when wheel 22 traverses rough ground. Lever 19 is enlarged at 61 to accommodate spring 30, between the side and end walls of the lever thus forming a protective housing for the spring as shown in Figure 3.

Pivot pin 18 is provided with a head 35 at one end and with a washer 36 and a split ring retainer 37 at the other end in order to removably secure it in the aligned bores 39 and 40 provided in ears 17 and in the channel sides 38 of arm 19.

Housing 10 is provided with a counterbored threaded opening 45 to receive a stop screw or bolt 47 having threads 48 and a head 46. The screw is locked in position by a nut 49. A washer 50 rests on top of nut 49 as shown in Figure 3 to provide a striking surface to limit the movement of arm 19 downwardly. The nut 51 and washer 52 comprise means which acts to limit the upward movement of arm 19 by engaging the bottom of cup 62 which is apertured at 63 to receive screw 47. The upper stop is particularly important since the arm must be prevented from rising far enough to produce scalping.

The level at which the housing 10 is supported above the ground is readily adjusted for varying conditions by means of the several stub shaft mounting holes 24 which constitute sockets in which the shaft 20 is selectively engageable to position the wheel 22, journaled thereon, at various levels respecting the housing.

I claim:

1. In a rotary mower, the combination with a housing for a rotary blade, said housing having generally horizontal extent, of supporting forward and rearward wheels therefor, relatively fixed means mounting the housing member from certain of said wheels, and a floating mounting for a forward wheel including a lever extending across an upper portion of said housing and having a pivotal connection with the housing at a point spaced inwardly from the periphery of said housing, the lever having a free end portion projecting from the housing and bearing means carried by the free end portion of the lever and upon which said forward wheel is rotatable, and a spring seated against the housing and against a portion of the lever which is immediately above the housing, said spring biasing downwardly the free end portion of said lever for the yieldable support of said housing from said spring.

2. The device of claim 1 in which the lever is of channeled cross section and the spring means comprises a helix wound about the pintle and having end portions respectively engaged with the housing and the lever, one of said end portions being enclosed within the channel of the lever.

3. The device of claim 1 in which the bearing means for said wheel comprises a shaft for which the free end of the lever is provided with a plurality of sockets in which the shaft is selectively engageable.

4. The device of claim 1 in further combination with a limiting bolt connected with the housing in a portion thereof across which said lever extends, the lever having an aperture through which the bolt projects and means on the bolt engaged with the lever for limiting movement thereof away from the housing, the lever being movable about said pintle in a range limited by the underlying portion of the housing in one direction and by said last mentioned means in the other direction, whereby to prevent contact between the housing and the ground.

References Cited in the file of this patent

UNITED STATES PATENTS

| | | |
|---|---|---|
| 1,659,829 | Mohler | Feb. 21, 1928 |
| 1,735,404 | Masury | Nov. 12, 1929 |
| 2,263,368 | Sejkora | Nov. 18, 1941 |
| 2,478,813 | Esleck | Aug. 9, 1949 |
| 2,490,870 | Heyn | Dec. 13, 1949 |
| 2,515,704 | Gardiner | July 18, 1950 |
| 2,539,779 | Grosso | Jan. 30, 1951 |
| 2,564,201 | Hainke | Aug. 14, 1951 |
| 2,692,466 | Brunts et al. | Oct. 26, 1954 |

FOREIGN PATENTS

| | | |
|---|---|---|
| 1,113,159 | France | Nov. 28, 1955 |